United States Patent [19]
Robic et al.

[11] Patent Number: 5,242,158
[45] Date of Patent: Sep. 7, 1993

[54] ADJUSTABLE HYDROELASTIC MOUNTING

[75] Inventors: Pascal Robic, Rennes; Marcel LeFol, Domloup, both of France

[73] Assignees: Automobiles Peugeot, Paris; Automobiles Citroen, Neuilly-sur-Seine, both of France

[21] Appl. No.: 798,610

[22] Filed: Nov. 26, 1991

[30] Foreign Application Priority Data

Dec. 10, 1990 [FR] France ................................ 90 15440

[51] Int. Cl.$^5$ .......................... F16F 13/00; B60K 5/12
[52] U.S. Cl. ............................ 267/140.14; 267/140.11
[58] Field of Search ................. 267/140.1 R, 140.11, 267/140.1 A, 140.13, 140.1 AE, 140.14, 219, 220, 35; 248/550, 562, 636

[56] References Cited

U.S. PATENT DOCUMENTS

| 4,546,960 | 10/1985 | Abrams et al. | 267/140.1 AE |
|---|---|---|---|
| 4,793,600 | 12/1988 | Kojima | 267/140.1 AE |
| 4,842,258 | 6/1989 | Misaka et al. | 267/219 |
| 4,905,955 | 3/1990 | Brizzolesi et al. | 267/140.1 A |
| 5,114,124 | 5/1992 | Muramatsu | 267/140.1 A |

FOREIGN PATENT DOCUMENTS

| 0115417 | 8/1984 | European Pat. Off. . |
|---|---|---|
| 0163162 | 12/1985 | European Pat. Off. . |
| 0163817 | 12/1985 | European Pat. Off. . |
| 0163949 | 12/1985 | European Pat. Off. . |
| 0297974 | 1/1989 | European Pat. Off. . |
| 0347666 | 12/1989 | European Pat. Off. . |
| 0358538 | 3/1990 | European Pat. Off. . |
| 2737985 | 3/1978 | Fed. Rep. of Germany . |
| 3801108 | 7/1989 | Fed. Rep. of Germany . |
| 2642493 | 8/1990 | France . |
| 59-103044 | 6/1984 | Japan . |
| 59-144839 | 8/1984 | Japan . |
| 61-119832 | 6/1986 | Japan . |
| 62-137437 | 6/1987 | Japan . |
| 63-62929 | 3/1988 | Japan . |
| 1-40733 | 2/1989 | Japan . |
| 1-158241 | 6/1989 | Japan . |
| 2164416 | 3/1986 | United Kingdom . |

OTHER PUBLICATIONS

Arnold R. Thompson, "Shock Mounting For Heavy Machines," NTIS Tech. Notes, No. 12, Dec. 1984, p. 1022, Springfield, Va. (USA).

Primary Examiner—Matthew C. Graham
Attorney, Agent, or Firm—Burns, Doane, Swecker & Mathis

[57] ABSTRACT

A hydroelastic mounting for interpositioning between two assemblies to be suspended with respect to one another, for example in suspending an engine in an automobile, has its components arranged in the general direction of stress on the mounting. The components include a first armature, a working chamber defined at least partially by an elastomer block, and a movable diaphragm that delimits the working chamber. Movement of the diaphragm is controlled in the direction of stress. The components further include an expansion chamber delimited by the movable diaphragm and by a flexible membrane as well as a second armature linked to the elastomer block. The working and expansion chambers are at least partially filled by a liquid and are linked together by a communication passage. The mount also includes a deformable assembly which cooperates with the movable diaphragm to control displacements thereof. A control device applies a deformation force to the deformable assembly.

11 Claims, 1 Drawing Sheet

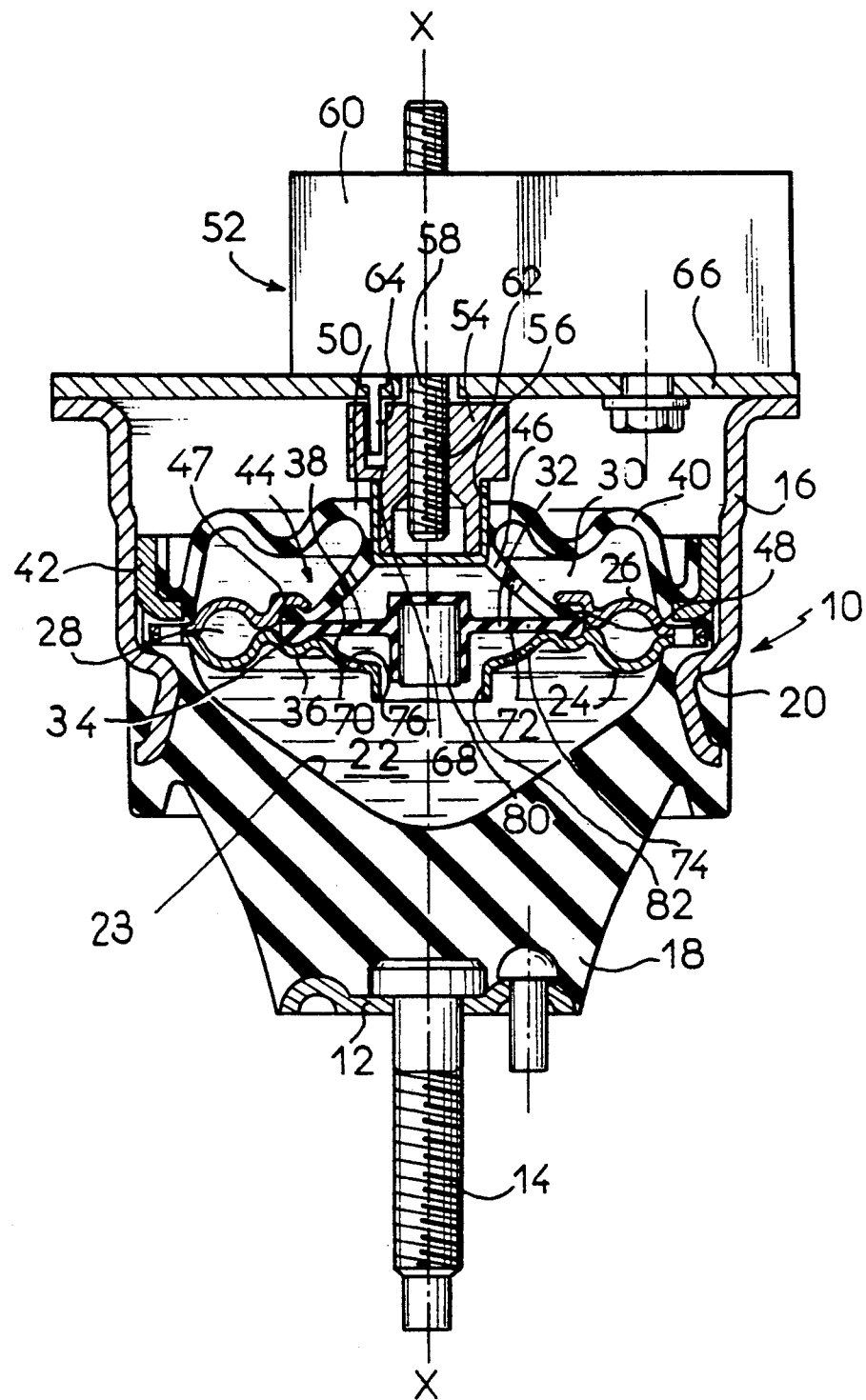

ADJUSTABLE HYDROELASTIC MOUNTING

BACKGROUND OF THE INVENTION

The present invention relates to a hydroelastic mounting intended to be interposed between two assemblies to be suspended one with regard to the other.

The invention relates more particularly to a mounting for the suspension of an engine in a motor vehicle.

SUMMARY OF THE INVENTION

The invention relates to an improvement of the so-called column-and-valve mountings of the type comprising, arranged successively in the general direction of stress on the mounting, a first armature, a block of elastomer material linked to the first armature, a working chamber delimited at least partially by the block of elastomer material, a movable diaphragm which delimits the working chamber and whose displacements in the said direction are controlled, an expansion chamber delimited by the movable diaphragm and by a flexible membrane, and a second armature linked to the block of elastomer material, the working and expansion chambers being filled at least partially by a liquid and being linked together by a communication passage.

In this type of mounting, valve is the name given to the movable diaphragm which permits variation of the stiffness of the mounting within a certain frequency range.

In this type of mounting, the stiffness of the filtering of the stresses emanating from the power plant, which for a four cylinder unit are the stresses whose frequency corresponds to the second order harmonic of the rotational speed of the engine, must be rendered as low as possible as it contributes to the propagation of noise through solid paths into the passenger compartment of the vehicle. This noise, which is generally called humming, very rapidly becomes unbearable and is not permissible in the case of a top-of-the-range vehicle.

In order to get over this problem, it is possible to externally tune the valve, that is to say to act on the movable diaphragm, in order to reduce the stiffness of the mounting to a zero value. The principle of action on the movable diaphragm is a result of the vibrational behavior of the latter.

The movable diaphragm loaded at a frequency lower than its resonant frequency, produces an anti-resonance effect which can then reduce the overall stiffness of the mounting to the point where the latter tends towards a zero value.

In fact, the movable diaphragm at resonance may produce a force in phase opposition and of identical value to the stress on the stiffness of the housing. The overall stiffness of the mounting is then a zero resultant.

The amplitude at resonance is a function of the viscous damping to which the movable diaphragm is subjected during its travel.

The frequency of this resonance is a function of various parameters, and especially of the mass of the movable diaphragm, of its own stiffness, of the stiffness under pressure of the block of elastomer material, of the stiffness under pressure of the membrane, of the effective cross section of the movable diaphragm, of the equivalent piston cross section of the block of elastomer material and of the equivalent cross section of the membrane.

It is thus apparent that it is possible to modify the resonance frequency and consequently the position in frequency of the stiffness null of the mounting by causing the stiffness of the movable diaphragm to vary.

The principle utilized for the invention thus consists in modifying externally the stiffness of the movable diaphragm to align the stiffness null with the loading frequency of the principle harmonic of the power plant.

In conformity with the principal characteristic of the invention, the mounting comprises means capable of elastic deformation which cooperate with the movable diaphragm to limit its displacements and means of control for applying a deforming force to the deformable means.

This design according to the invention has particular advantages as it is simple and of particularly low cost. One simple command by a quasi-static movement permits a stiffness null in dynamic conditions to be obtained.

The design according to the invention is much simpler than those known from the state of the art, such as for example from the document FR-A-2,627,565, in which the mounting is tuned dynamically and thus necessitates the employment of particularly costly means. Dynamic control or tuning is of complex design as the system must produce a precise loading in phase with the engine excitations. Moreover, this type of dynamic control system is not satisfactory as it can produce harmonics which are then responsible for noises at higher frequencies.

According to other characteristics of the invention:

the movable diaphragm has substantially the form of a disc linked by its periphery to the second armature, the membrane having in cross section an arc-shaped profile and being arranged coaxially with the movable diaphragm, the means capable of elastic deformation comprising at least one linking arm which extends substantially from the periphery of the movable diaphragm up to the central area of the membrane, the means of control being arranged outside the expansion chamber and acting on the membrane in the central area of the latter in a direction substantially coincident with the axis common to the membrane and the disc;

the deformable means comprise a plurality of linking arms distributed in a regular manner around the axis of the membrane;

the linking arms are linked together to constitute a deformable member of truncated conical form whose wall is pierced by calibrated orifices;

the periphery of the movable diaphragm is fitted and clamped in a leaktight manner between the opposed internal circular edges of two rigid annular plates;

the circular periphery of the deformable member of truncated conical form is fitted and clamped between the periphery of the movable diaphragm and the internal circular edge of one of the two annular plates;

the means capable of elastic deformation are integral with the flexible membrane;

the means of control comprise a core mounted axially movable with regard to the second armature and of which one extremity is fixed to the central area of the membrane;

the extremity of the core is a cylindrical portion and the said central area comprises a central sleeve whose wall is bonded to the central area and in which is fitted and clamped the said cylindrical portion;

the annular plate arranged axially on the side of the block of elastomer material comprises a part which has in cross section an arc-shaped profile extending from the internal circular edge of this plate towards the inside of the working chamber and which comprises at least one orifice for the passage of the liquid;

the arc-shaped part has a central orifice which allows the passage of a compensating weight fixed to the movable diaphragm;

the wall of the arc-shaped part is pierced by calibrated orifices.

Other characteristics and advantages of the invention will become clear on reading the detailed description which follows for the understanding of which reference will be made to the attached drawing of which the single figure is a view in axial section of a preferred embodiment of a hydroelastic mounting constructed in accordance with the teachings of the invention.

BRIEF DESCRIPTION OF THE DRAWING

The figure shows a hydroelastic mounting 10 of a form which is generally circular around an axis X—X.

DETAILED DESCRIPTION OF THE INVENTION

The mounting comprises a first armature 12 provided to be linked to the structure of the chassis of a motor vehicle by a threaded connection 14.

The first armature 12 is linked to a second cylindrical armature 16 by a block of elastomer material 18 whose lower plane surface is bonded to the first armature 12.

The cylindrical armature 16 comprises in the vicinity of its lower axial extremity an internal radial shoulder 20 which is set into the block of elastomer material 18.

The mounting 10 comprises a working chamber 22 which is delimited in part by the block of elastomer material whose upper surface 23 is hollowed out for this purpose.

The working chamber 22 is also delimited by a first annular plate 24 which cooperates with a complementary second annular plate 26 to constitute an assembly known as a cassette.

The two plates 24 and 26 delimit between them a passage or channel 28 which puts the working chamber 22 in communication with an expansion chamber 30.

The working chamber 22 is finally delimited by a movable diaphragm 32 which extends in a radial plane perpendicular to the axis X—X.

The movable diaphragm 32 is formed in elastomer material capable of elastic deformation and has the general form of a disc whose radial periphery 34 is received in a portion of corresponding profile 36 of the first annular plate 24 formed in the vicinity of its internal circular edge.

The expansion chamber 30 is delimited on the one hand by the second plate 26 and by the upper surface 38 of the movable diaphragm 32 and, on the other hand, by a flexible membrane in deformable elastomer material 40.

The flexible membrane 40 carries an external cylindrical metallic reinforcement 42 which is set into the internal wall of the second cylindrical armature 16 in such a way as to ensure the leakproof integrity of the expansion chamber 30 by virtue of the action of the elastomer material with the upper surface of the plate 26 in the area of the external circular edge of the latter.

The working 22 and expansion 40 chambers are filled with a liquid which can circulate from one to the other through the passage 28 in such a way as to constitute a hydroelastic mounting of the damping-column type.

According to the invention the mounting 10 comprises means capable of elastic deformation 44 which cooperate with the upper surface 38 of the movable diaphragm 32 in order to control the displacements of the latter in the direction of the axis X—X.

In the preferred embodiment of the invention shown in the figure, the means capable of elastic deformation 44 are constituted by a member of the general form of a truncated cone 46 made of elastomer material capable of elastic deformation and integral with the membrane 40.

The large-diameter lower radial periphery 48 of the truncated conical part 46 is mounted and set into a portion of corresponding profile 47 of the second plate 26 and clamped in a leaktight manner with the periphery 34 of the movable diaphragm 38.

In a section through an axial plane, and as shown in the figure, the conical part 46 defines two arms capable of elastic deformation which extend from the lower periphery 48 up to the central area 50 of the deformable membrane 40 to which is linked the smaller-diameter upper circular edge of the truncated conical part 46.

According to the invention, the mounting also comprises means 52 for applying to the deformable parts 44 a deforming force in the direction of the axis X—X.

The means 52 comprise a central core 54 of a generally cylindrical profile fitted and clamped circumferentially into the mounting in a metal sleeve 56 bonded to the central area 50 of the flexible membrane 40.

The means of control 52 also comprise a screw 58 which is driven in rotation by an electromagnetic actuator 60 and which cooperates with an internal threading 62 formed in the core 54.

In order to convert the rotation of the screw 58 into an axial displacement of the core 54, the latter is prevented from turning by virtue of a pin 64 which is fixed onto a radial plate 66 closing the upper edge of the second cylindrical armature 16 and which is received in a corresponding hole 68 in the core 54.

It will be understood that an axial displacement of a core 54 in the direction of the movable diaphragm, that is to say in the downwards direction on the figure, has the effect of producing a deformation of the truncated conical part 46, the arms then coming to bear on the upper surface 38 of the movable diaphragm 32 by means of their inner surface 70.

The more or less significant interaction between the member 44 capable of elastic deformation and the movable diaphragm 32 has the effect of modifying the resonant frequency of the movable diaphragm 32.

The means of control 52 are, for example, driven as a function of the rotational speed of the power plant to which the second armature 16 is linked.

The truncated conical part 46 comprises a series of calibrated holes 72 which permit the achievement of a equilibrium in the liquid and which have an effect on the anti-resonance phenomenon.

In fact, the anti-resonance of the movable diaphragm 32 depends on its own elastic properties, on the force which is applied to it by the deformable member 44, but also on the displacements of the liquid contained in the expansion chamber 40.

The calibrated holes 72 for evacuation of the liquid have a cross section determined such that they bring about a loss of charge which then defines the magnitude of the viscous damping effect which is applied to the movable diaphragm 32.

In the same way, the first plate 24 which delimits the working chamber 22 is extended radially towards the inside from its circular edge 36 through a portion 74 with the profile of an arc of a circle which, in the example shown, is substantially hemispherical. Calibrated holes 76 are provided in the portion 74 and perform a function equivalent to that of the calibrated holes 72 in the truncated conical part 46.

The resonant frequency of the valve is also determined as a function of the compensating weight 80 which is bonded to it at its centre and which has the form of a cylinder which is displaced with the movable diaphragm 32, a corresponding cylindrical central orifice 82 being provided for this purpose in the arc-shaped portion 74 of the second plate 24.

The invention is not limited to the embodiment which has just been described It is, for example, possible to replace the nut and bolt actuating system by a linear actuator which acts directly on to the core 54 in the direction X—X.

We claim:

1. Hydroelastic mounting for interposition between two assemblies to be suspended with respect to one another, the mounting comprising the following elements arranged successively in the general direction of stress on the mounting: a first armature, a block of elastomer material linked to the first armature, a working chamber delimited at least partially by the block of elastomer material, a movable diaphragm which delimits the working chamber and whose displacements in the direction are controlled, an expansion chamber delimited by the movable diaphragm and by a flexible membrane and a second armature linked to the block of elastomer material, the said working and expansion chambers being filled at least partially by a liquid and being linked together by a communication passage, further including elastically deformable means which cooperate with the said movable diaphragm in order to control displacements of the movable diaphragm and means of control for applying a deforming force to the said deformable means;

wherein the movable diaphragm has substantially the form of a disc linked by its outer periphery to the second armature, in that the said membrane has in cross section a circular profile and is arranged coaxially with the movable diaphragm, and in that the said means capable of elastic deformation comprise at least one linking arm which extends substantially from the periphery of the movable diaphragm up to a central area of the flexible membrane, the said means of control being arranged outside the expansion chamber and acting on the flexible membrane in the central area of the latter in a direction substantially coincident with the axis of the membrane and of the disc.

2. Mounting according to claim 1, characterized in that the said deformable means comprise a plurality of linking arms distributed in a regular manner around the axis of the membrane.

3. Mounting according to claim 2, characterized in that the arms are linked together to constitute a deformable member of truncated conical form whose wall is pierced by calibrated orifices.

4. Mounting according to claim 1, characterized in that the periphery of the movable diaphragm is fitted and clamped in a leaktight manner between the opposed internal circular edges of two rigid annular plates.

5. Mounting according to claim 4, characterized in that the circular periphery of the deformable member of truncated conical form is fitted and clamped between the periphery of the movable diaphragm and the internal circular edge of one of the said two annular plates.

6. Mounting according to claim 4, characterized in that one of said two annular plates arranged axially on the side of the block of elastomer material comprises a part which has in cross section an arc-shaped profile which extends from its internal circular edge towards the inside of the working chamber and which comprises at least one orifice for the passage of the liquid.

7. Mounting according to claim 6, characterized in that the said part having an arc-shaped profile comprises a central orifice which allows the passage of a compensating weight of the movable diaphragm.

8. Mounting according to claim 7, characterized in that a wall of the said part having an arc-shaped profile is pierced by calibrated orifices.

9. Mounting according to claim 1, characterized in that the means capable of elastic deformation are integral with the flexible membrane.

10. Mounting according to claim 1, characterized in that the said means of control comprise a core mounted axially movable with regard to the second armature and of which one extremity is fixed to the central area of the flexible membrane.

11. Mounting according to claim 10, characterized in that the extremity of the core is a cylindrical portion and in that the said central area comprises a central sleeve whose wall is bonded to the central area and in which is fitted and clamped the said cylindrical portion.

* * * * *